(12) United States Patent
Tsukida et al.

(10) Patent No.: US 10,332,681 B2
(45) Date of Patent: *Jun. 25, 2019

(54) MULTILAYER CAPACITOR AND MANUFACTURING METHOD FOR SAME

(71) Applicant: Murata Manufacturing Co., Ltd., Nagaokakyo-shi, Kyoto-fu (JP)

(72) Inventors: Masaki Tsukida, Nagaokakyo (JP); Hiroshi Masai, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/137,579

(22) Filed: Sep. 21, 2018

(65) Prior Publication Data

US 2019/0027310 A1 Jan. 24, 2019

Related U.S. Application Data

(60) Division of application No. 15/802,648, filed on Nov. 3, 2017, now Pat. No. 10,109,420, which is a
(Continued)

(30) Foreign Application Priority Data

Nov. 28, 2014 (JP) .................................. 2014-241391

(51) Int. Cl.
*H01G 4/012* (2006.01)
*H01G 4/30* (2006.01)
(Continued)

(52) U.S. Cl.
CPC .............. *H01G 4/012* (2013.01); *H01G 4/232* (2013.01); *H01G 4/30* (2013.01); *H01G 4/12* (2013.01)

(58) Field of Classification Search
CPC .......... H01G 4/005; H01G 4/012; H01G 4/12; H01G 4/32; H01G 4/1227
See application file for complete search history.

(56) References Cited

U.S. PATENT DOCUMENTS 9,653,214 B2 * 5/2017 Hattori ..................... H01G 4/30
9,911,534 B2 * 3/2018 Tsukida ................. H01G 4/012
(Continued)

OTHER PUBLICATIONS

Tsukida el al., "Multilayer Capacitor and Manufacturing Method for Same", U.S. Appl. No. 14/943,771, filed Nov. 17, 2015.
(Continued)

*Primary Examiner* — Nguyen T Ha
(74) *Attorney, Agent, or Firm* — Keating & Bennett, LLP

(57) ABSTRACT

A manufacturing method for a multilayer capacitor includes alternately laminating dielectric layers and conductor layers including less than 50 included in a first arrangement and a second arrangement different from the first arrangement when viewed from a lamination direction to form a laminate in which at least one pair of the conductor layers adjacent to each other with the dielectric layer interposed therebetween are included in the first or second arrangement, pressing the laminate to stretch the conductor layers in a direction perpendicular or substantially perpendicular to the lamination direction, pressing the laminate to bend the conductor layers in the lamination direction, and forming first and second outer electrodes on laminate surfaces such that the first outer electrode is connected to the conductor layers included in the first arrangement and the second outer electrode is connected to the conductor layers included in the second arrangement.

3 Claims, 10 Drawing Sheets

Related U.S. Application Data continuation of application No. 14/943,771, filed on Nov. 17, 2015, now Pat. No. 9,911,534.

(51) Int. Cl.
*H01G 4/232* (2006.01)
*H01G 4/12* (2006.01)

(56) References Cited

U.S. PATENT DOCUMENTS

| | | | | |
|---|---|---|---|---|
| 10,074,479 B2* | 9/2018 | Tsukida | ............ | H01G 4/012 |
| 2007/0278907 A1* | 12/2007 | Kondo | ............ | H01L 41/0471 |
| | | | | 310/364 |
| 2009/0278649 A1* | 11/2009 | Tatsukawa | ............ | H01F 17/0013 |
| | | | | 336/200 |

OTHER PUBLICATIONS

Tsukida el al., "Multilayer Capacitor and Manufacturing Method for Same", U.S. Appl. No. 15/802,648, filed Nov. 3, 2017.
Tsukida el al., "Multilayer Capacitor and Manufacturing Method for Same", U.S. Appl. No. 15/802,642, filed Nov. 3, 2017.

\* cited by examiner

MULTILAYER CAPACITOR AND MANUFACTURING METHOD FOR SAME

BACKGROUND OF THE INVENTION

1. Field of the Invention

The present invention relates to a multilayer capacitor and a manufacturing method for a multilayer capacitor. More particularly, the present invention relates to an ultra-small multilayer capacitor and a manufacturing method for an ultra-small multilayer capacitor.

2. Description of the Related Art

Japanese Unexamined Patent Application Publication No. 2007-299984 discloses a multilayer capacitor that is intended to reduce variations of an electrostatic capacitance. Generally, a multilayer capacitor is designed to have the desired electrostatic capacitance. Parameters determining the electrostatic capacitance of the multilayer capacitor include the dielectric constant of a dielectric that constitutes ceramic layers, i.e., effective dielectric layers, the area of a region where a pair of electrodes is opposed to each other with the ceramic layers sandwiched therebetween, the distance between the electrodes, and the number of the laminated ceramic layers. The electrostatic capacitance of the multilayer capacitor is proportional to the dielectric constant of the dielectric, the area of the region where the pair of electrodes is opposed to each other, and the number of the laminated ceramic layers, whereas it is reversely proportional to the distance between the electrodes. In designing the multilayer capacitor having the desired electrostatic capacitance, it has so far been usual to employ one of the following three adjustment methods.

In a first adjustment method, the number of the laminated ceramic layers is increased or decreased. In a second adjustment method, the distance between the electrodes is increased or decreased by changing the thickness of the ceramic layer. In a third adjustment method, the area of the region where the pair of electrodes is opposed to each other is increased or decreased by shifting the arranged positions of the pair of electrodes.

In the case of a multilayer capacitor downsized to an ultra-small size, the number of the laminated ceramic layers is reduced. Therefore, a change rate of the electrostatic capacitance caused by increasing or decreasing the number of the laminated ceramic layers is increased relatively. In more detail, when the number of the laminated ceramic layers is 200, the electrostatic capacitance per ceramic layer occupies just 0.5% of that of the entire multilayer capacitor, and the electrostatic capacitance can be adjusted in units of 0.5%. However, when the number of the laminated ceramic layers is 50, the electrostatic capacitance per ceramic layer occupies 2% of that of the entire multilayer capacitor, and when the number of the laminated ceramic layers is 10, the electrostatic capacitance per ceramic layer occupies 10% of that of the entire multilayer capacitor.

Thus, as the number of the laminated ceramic layers is reduced, the electrostatic capacitance of the multilayer capacitor is changed to a larger extent depending on an increase or a decrease in the number of the laminated ceramic layers. It is therefore difficult, in the ultra-small multilayer capacitor, to obtain the desired electrostatic capacitance by the adjustment method of increasing or decreasing the number of the laminated ceramic layers.

When a proportion of the electrostatic capacitance per ceramic layer with respect to that of the entire multilayer capacitor is large, the electrostatic capacitance of the multilayer capacitor is greatly changed depending on an increase or a decrease in the distance between the electrodes. In the ultra-small multilayer capacitor, therefore, it is also difficult to obtain the desired electrostatic capacitance by the adjustment method of increasing or decreasing the distance between the electrodes.

Moreover, in the multilayer capacitor downsized to the ultra-small size, a space usable to shift the positions of the pair of electrodes relative to each other is reduced from the viewpoint of ensuring moisture resistance, etc., and a difficulty occurs in shifting the positions of the pair of electrodes to increase or decrease the area of the region where the pair of electrodes is opposed to each other. Accordingly, it is difficult, in the ultra-small multilayer capacitor, to obtain the desired electrostatic capacitance by the adjustment method of shifting the positions of the pair of electrodes, thereby increasing or decreasing the area of the region where the pair of electrodes is opposed to each other.

Thus, the ultra-small multilayer capacitor has a difficulty in obtaining the desired electrostatic capacitance by the ordinary adjustment methods.

SUMMARY OF THE INVENTION

In view of the problems described above, preferred embodiments of the present invention provide an ultra-small multilayer capacitor having a desired electrostatic capacitance, and a manufacturing method for an ultra-small multilayer capacitor.

According to one preferred embodiment of the present invention, there is provided a manufacturing method for a multilayer capacitor including a laminate that includes conductor layers and dielectric layers alternately laminated, and that has external dimensions with a length of about 0.45 mm or less and a width of about 0.25 mm or less when viewed from a lamination direction, for example, and a first outer electrode and a second outer electrode disposed on surfaces of the laminate.

The manufacturing method includes a laminating step of alternately laminating the dielectric layers and the conductor layers such that the conductor layers are in a first arrangement and a second arrangement, the second arrangement being different from the first arrangement when viewed from the lamination direction, and such that less than 50 of the conductor layers are included in the first arrangement or the second arrangement, to form a laminate in which at least one pair of the conductor layers adjacent to each other with the dielectric layer interposed therebetween are both included in the first arrangement or both included in the second arrangement, a stretching step of pressing the laminate to stretch the conductor layers in a direction perpendicular or substantially perpendicular to the lamination direction, a bending step of pressing the laminate to bend the conductor layers in the lamination direction, and an outer electrode forming step of forming the first outer electrode and the second outer electrode on the surfaces of the laminate in a state where the first outer electrode is connected to ones of the conductor layers included in the first arrangement, and the second outer electrode is connected to others of the conductor layers included in the second arrangement.

In a specific preferred embodiment of the present invention, preferably, an effective dielectric layer is defined such that one of the dielectric layers is sandwiched between the conductor layer included in the first arrangement and the conductor layer included in the second arrangement; an ineffective dielectric layer is defined such that one of the dielectric layers is sandwiched between the conductor layers both included in one of the first arrangement and the second arrangement; and in the laminating step the conductor layers and the dielectric layers are laminated to satisfy the total number of the effective dielectric layers and the total number of the conductor layers which are determined based on electrostatic capacitance per the effective dielectric layer and an increase rate of electrostatic capacitance of the multilayer capacitor due to an increase of one ineffective dielectric layer.

In a specific preferred embodiment of the present invention, preferably, the conductor layers and the dielectric layers are laminated in the laminating step such that at least one of the two conductor layers positioned at both ends of the laminate in the lamination direction is adjacent to the ineffective dielectric layer.

In a specific preferred embodiment of the present invention, preferably, the conductor layers and the dielectric layers are laminated in the laminating step such that at least one of the conductor layers is adjacent to the ineffective dielectric layer, the at least one of the conductor layers being positioned in a central region resulting from dividing a space between the two conductor layers positioned at both ends of the laminate in the lamination direction into three equal regions.

According to another preferred embodiment of the present invention, there is provided a multilayer capacitor including a laminate that includes conductor layers and dielectric layers alternately laminated, and that has external dimensions with a length of about 0.45 mm or less and a width of about 0.25 mm or less when viewed from a lamination direction, and a first outer electrode and a second outer electrode disposed on surfaces of the laminate, which are spaced from each other in a lengthwise direction of the laminate. In the laminate, the dielectric layers and the conductor layers are alternately laminated such that the conductor layers are arranged in a first arrangement and a second arrangement, the second arrangement being different from the first arrangement when viewed from the lamination direction, and such that 50 of the conductor layers are included in the first arrangement or the second arrangement. The first outer electrode is connected to ones of the conductor layers included in the first arrangement. The second outer electrode is connected to others of the conductor layers included in the second arrangement. A width of each conductor layer has a difference of less than about 0.12 mm between the width of the conductor layer and a width of the laminate, and is about 70% or less of the width of the laminate, for example. At least one of the dielectric layers is an ineffective dielectric layer that is sandwiched between the conductor layers both positioned in one of the first arrangement and the second arrangement. At least one of the dielectric layers is an effective dielectric layer that is sandwiched between the conductor layer included in the first arrangement and the conductor layer included in the second arrangement. At least one of the conductor layers adjacent to the effective dielectric layer is curved in the lamination direction.

In a specific preferred embodiment of the present invention, preferably, an extent of curvature of at least one of the two conductor layers positioned at both ends of the laminate in the lamination direction, the extent of curvature being measured in a section perpendicular or substantially perpendicular to the lengthwise direction, is larger than a thickness of the dielectric layer that is adjacent to the at least one of the two conductor layers.

In a specific preferred embodiment of the present invention, preferably, at least one of the two conductor layers positioned at both ends of the laminate in the lamination direction is adjacent to the ineffective dielectric layer.

In a specific preferred embodiment of the present invention, preferably, at least one of the conductor layers is adjacent to the ineffective dielectric layer, the at least one of the conductor layers being positioned in a central region resulting from dividing a space between the two conductor layers positioned at both ends of the laminate in the lamination direction into three equal regions.

According to various preferred embodiments of the present invention, ultra-small multilayer capacitors having the desired electrostatic capacitance are provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
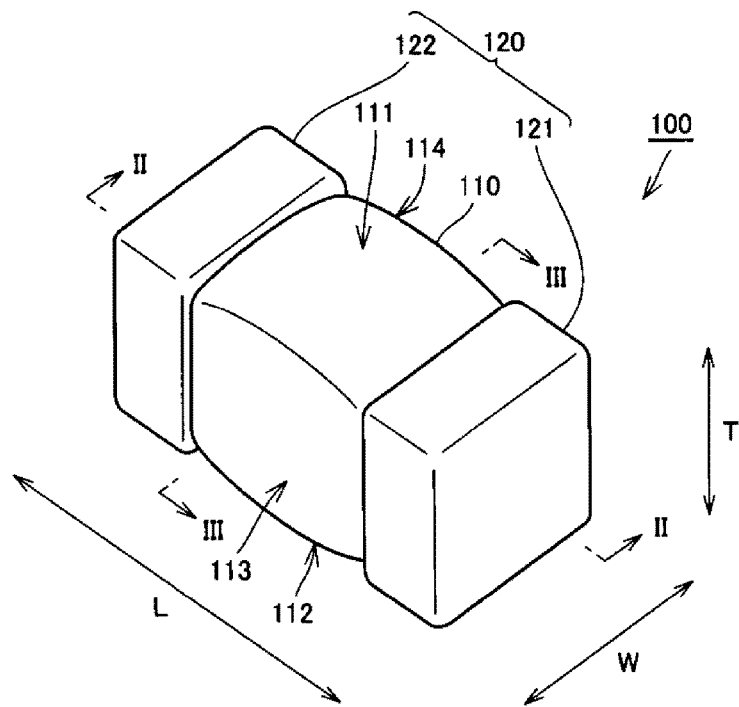
FIG. 1 is a perspective view illustrating an external appearance of a multilayer capacitor according to a first preferred embodiment of the present invention.

Multilayer capacitors according to preferred embodiments of the present invention and manufacturing methods for the multilayer capacitors will be described below with reference to the drawings. In the following description of the preferred embodiments, the same or corresponding elements and portions in the drawings are denoted by the same reference sings, and explanation of those elements or portions is not repeated.

First Preferred Embodiment

Figure 2:
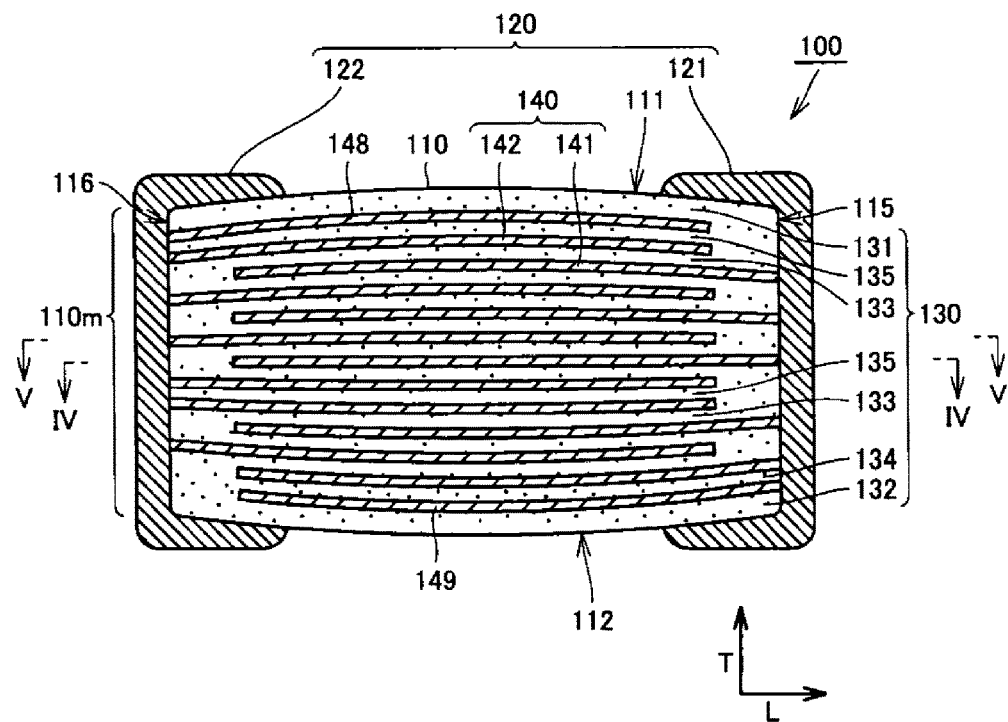
FIG. 2 is a sectional view of the multilayer capacitor illustrated in FIG. 1 when taken along a line II-II and viewed from a direction denoted by arrow.
Figure 3:
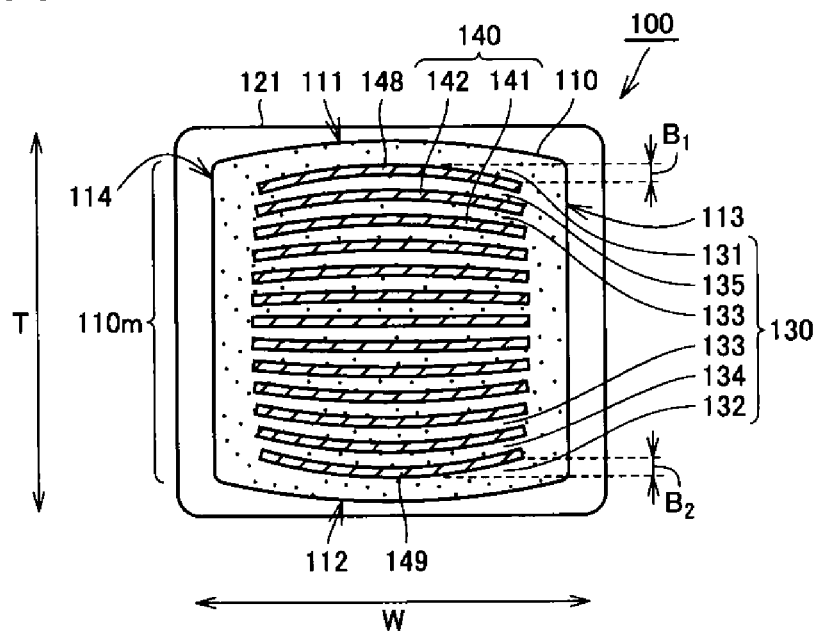
FIG. 3 is a sectional view of the multilayer capacitor illustrated in FIG. 1 when taken along a line III-III and viewed from a direction denoted by arrow.
Figure 4:
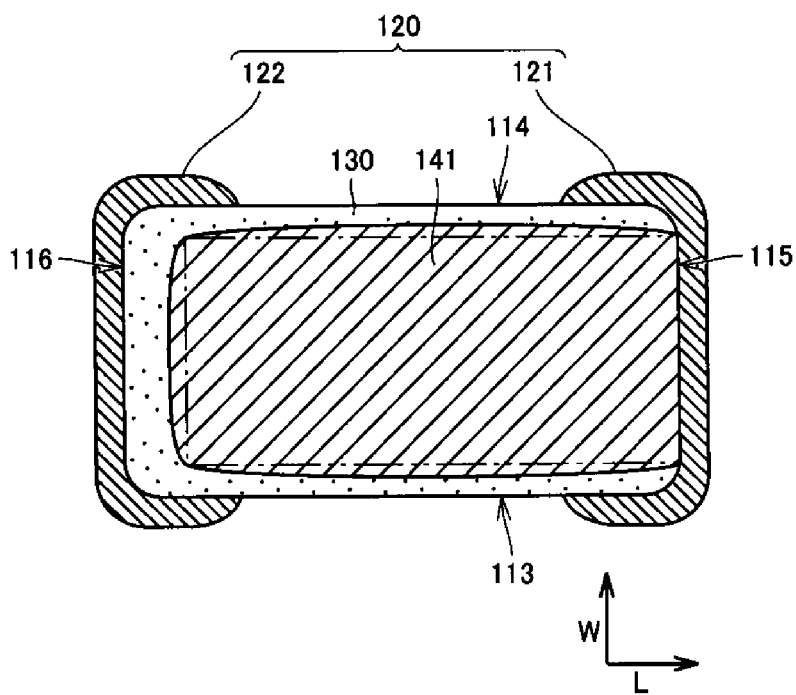
FIG. 4 is a sectional view of the multilayer capacitor illustrated in FIG. 2 when taken along a line IV-IV and viewed from a direction denoted by arrow.
Figure 5:
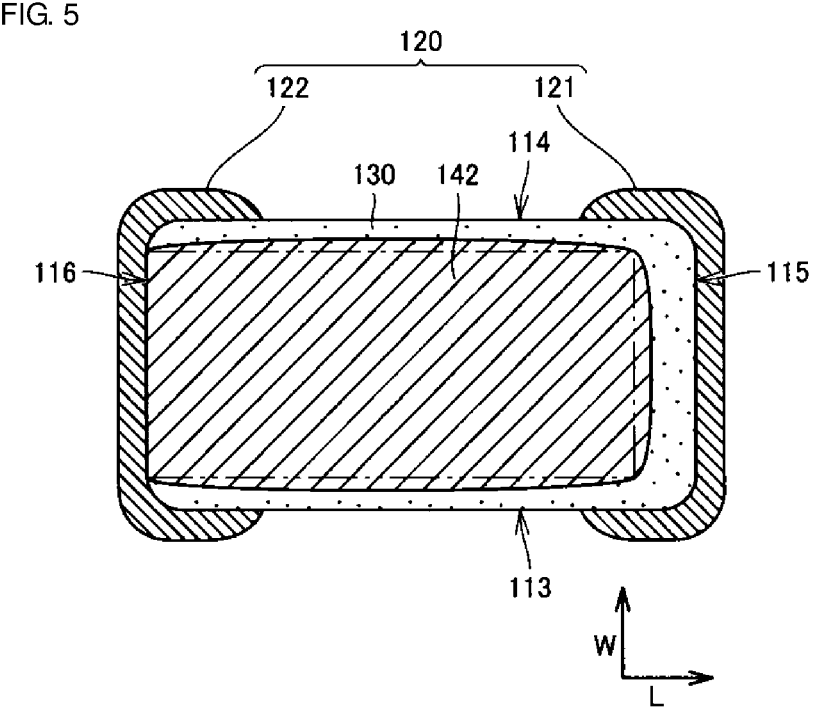
FIG. 5 is a sectional view of the multilayer capacitor illustrated in FIG. 2 when taken along a line V-V and viewed from a direction denoted by arrow.

FIG. 1 is a perspective view illustrating an external appearance of a multilayer capacitor according to a first preferred embodiment of the present invention. FIG. 2 is a sectional view of the multilayer capacitor illustrated in FIG. 1 when taken along a line II-II and viewed from a direction denoted by arrow. FIG. 3 is a sectional view of the multilayer capacitor illustrated in FIG. 1 when taken along a line III-III and viewed from a direction denoted by arrow. FIG. 4 is a sectional view of the multilayer capacitor illustrated in FIG. 2 when taken along a line IV-IV and viewed from a direction denoted by arrow. FIG. 5 is a sectional view of the multilayer capacitor illustrated in FIG. 2 when taken along a line V-V and viewed from a direction denoted by arrow. Definition of directions used in the following description, i.e., a lengthwise direction L of a laminate, a widthwise direction W of the laminate, and a thickness direction T of the laminate, are as per illustrated in FIG. 1.

As illustrated in FIGS. 1 to 5, a multilayer capacitor 100 according to the first preferred embodiment of the present invention includes a laminate 110 that includes dielectric layers 130 and conductor layers 140 alternately laminated, and that includes a first principal surface 111 and a second principal surface 112 positioned at the opposite sides, and a pair of outer electrodes 120 including a first outer electrode 121 and a second outer electrode 122 disposed on surfaces of the laminate 110.

A direction in which the dielectric layers 130 and the conductor layers 140 are laminated is perpendicular or substantially perpendicular to both the lengthwise direction L of the laminate 110 and the widthwise direction W of the laminate 110. In other words, the direction in which the dielectric layers 130 and the conductor layers 140 are laminated is parallel or substantially parallel to the thickness direction T of the laminate 110.

The laminate 110 further includes a first end surface 115 and a second end surface 116 interconnecting the first principal surface 111 and the second principal surface 112 and positioned opposite to each other, and a first lateral surface 113 and a second lateral surface 114 interconnecting the first principal surface 111 and the second principal surface 112, interconnecting the first end surface 115 and the second end surface 116, and positioned opposite to each other. The shortest distance between the first lateral surface 113 and the second lateral surface 114 is less than that between the first end surface 115 and the second end surface 116. In other words, the size of the laminate 110 in the widthwise direction W is smaller than that of the laminate 110 in the lengthwise direction L. Alternatively, the size of the laminate 110 in the widthwise direction W of the laminate 110 may be larger than that of the laminate 110 in the lengthwise direction L. The laminate 110 preferably has a substantially rectangular parallelepiped external shape. The concept of "substantially rectangular parallelepiped external shape" involves a shape resulting from rounding corners and/or ridges of a rectangular parallelepiped.

The laminate 110 preferably has external dimensions with a length of about 0.45 mm or less and a width of about 0.25 mm or less when viewed from the lamination direction, for example. In this preferred embodiment, the external dimensions (design values) of the laminate 110 preferably are about 0.212 mm in length and about 0.102 mm in width, for example.

In this preferred embodiment, the pair of outer electrodes 120 is disposed on the surfaces of the laminate 110 at positions spaced from each other in the lengthwise direction L of the laminate 110. More specifically, the pair of outer electrodes 120 includes a first outer electrode 121 disposed at the side including the first end surface 115 in the lengthwise direction L of the laminate 110, and a second outer electrode 122 disposed at the side including the second end surface 116 in the lengthwise direction L of the laminate 110.

In the laminate 110, the conductor layers 140 and the dielectric layers 130 are alternately laminated in a state where the conductor layers are arranged to be positioned in a first arrangement and a second arrangement, the second arrangement being different from the first arrangement when viewed from the lamination direction, such that the conductor layers in number less than 50 are each included in the first arrangement or the second arrangement. The conductor layers 140 include a plurality of first conductor layers 141, which are included in the first arrangement and are connected to the first outer electrode 121, and a plurality of second conductor layers 142, which are included in the second arrangement and are connected to the second outer electrode 122.

The first conductor layers 141 and the second conductor layers 142 are each preferably substantially rectangular when looked at in a plan view. In more detail, three sides of each first conductor layer 141 except for a side positioned at the first end surface 115 are expanded outwards when looked at in a plan view. Three sides of each second conductor layer 142 except for a side positioned at the second end surface 116 are expanded outwards when looked at in a plan view.

In this preferred embodiment, the plurality of first conductor layers 141 is exposed to the first end surface 115 of the laminate 110, and is connected to the first outer electrode 121 at the first end surface 115. The plurality of second conductor layers 142 is exposed to the second end surface 116 of the laminate 110, and is connected to the second outer electrode 122 at the second end surface 116. In this preferred embodiment, the number of the laminated first conductor layers 141 is 6, and the number of the laminated second conductor layers 142 is 7. Thus, the number of the laminated conductor layers 140 is 13.

The width of the conductor layer 140 is set such that the difference between the width of the conductor layer 140 the width of the laminate 110 preferably is less than about 0.12 mm, and that it is about 70% or less of the width of the laminate 110, for example. As a result, later-described adjustment of the electrostatic capacitance of the multilayer capacitor 100 is facilitated. In this preferred embodiment, the width (design value) of the conductor layer 140 preferably is about 0.047 mm, for example. Accordingly, the difference between the width (design value) of the conductor layer 140 and the width (design value) of the laminate 110 preferably is about 0.055 mm, and the width (design value) of the conductor layer 140 is about 46% of the width (design value) of the laminate 110, for example.

The dielectric layers 130 include a first outer layer portion 131 defining the first principal surface 111, a second outer layer portion 132 defining the second principal surface 112, at least one effective dielectric layer 133 sandwiched between the first conductor layer 141 and the second conductor layer 142, and at least one ineffective dielectric layer sandwiched between the first conductor layers 141 or between the second conductor layers 142. The ineffective dielectric layer includes a first ineffective dielectric layer 134 sandwiched between the first conductor layers 141 and a second ineffective dielectric layer 135 sandwiched between the second conductor layers 142.

The thickness of the ineffective dielectric layer is equal or substantially equal to that of the effective dielectric layer 133. More specifically, the thickness of the ineffective dielectric layer is more than about 0.5 time and less than about 2 times that of the effective dielectric layer 133, for example. The ineffective dielectric layer and the effective dielectric layer 133 are defined by ceramic green sheets having the same thickness, as described later.

The conductor layers 140 include a conductor layer 140 sandwiched between the effective dielectric layer 133 and the ineffective dielectric layer. More specifically, between the first conductor layer 141 and the second conductor layer 142, another first conductor layer 141 or another second conductor layer 142 is laminated with the dielectric layer 130 sandwiched between the adjacent conductor layers.

A region of the laminate 110, which is sandwiched between the first outer layer portion 131 and the second outer layer portion 132, is called an inner layer portion. In this preferred embodiment, the inner layer portion includes nine effective dielectric layers 133, one first ineffective dielectric layer 134, and two second ineffective dielectric layers 135.

The first ineffective dielectric layer 134 is positioned at an end of the inner layer portion on the side close to the second principal surface 112. One of the two second ineffective dielectric layers 135 is positioned at an end of the inner layer portion on the side close to the first principal surface 111. In other words, two conductor layers 140 positioned at both the ends of the laminate 110 in the lamination direction are each adjacent to the ineffective dielectric layer. More specifically, a second conductor layer 148 positioned closest to the first principal surface 111 in the lamination direction of the laminate 110 is adjacent to the second ineffective dielectric layer 135. A first conductor layer 149 positioned closest to the second principal surface 112 in the lamination direction of the laminate 110 is adjacent to the first ineffective dielectric layer 134.

The other of the two second ineffective dielectric layers 135 is positioned in the central region resulting from dividing the space between two conductor layers 140, which are positioned at both the ends of the laminate 110 in the lamination direction, into the three equal regions, and it is located nearest to the center of the inner layer portion. Stated in another way, one conductor layer 140 positioned in the central region resulting from dividing the space between the two conductor layers 140, which are positioned at both the ends of the laminate 110 in the lamination direction, into the three equal regions is adjacent to the ineffective dielectric layer.

In the multilayer capacitor 100 according to this preferred embodiment, the conductor layer 140 adjacent to the effective dielectric layer 133 is curved. More specifically, as illustrated in FIG. 2, the conductor layer 140 adjacent to the effective dielectric layer 133 is curved in a section, which is perpendicular or substantially perpendicular to the widthwise direction W of the laminate 110, to project in a direction away from the center of the laminate 110 along the lamination direction. As illustrated in FIG. 3, the conductor layer 140 adjacent to the effective dielectric layer 133 is further curved in a section, which is perpendicular or substantially perpendicular to the lengthwise direction L of the laminate 110, to project in a direction away from the center of the laminate 110 along the lamination direction.

An extent of curvature of the conductor layer 140 adjacent to the dielectric layer 130 increases as the position of the relevant conductor layer 140 approaches the end of the laminate 110 in the lamination direction. As illustrated in FIG. 3, an extent of curvature of each of two conductor layers 140 in the section perpendicular or substantially perpendicular to the lengthwise direction L of the laminate 110, those two conductor layers 140 being positioned at both the ends of the laminate 110 in the lamination direction, is larger than the thickness of the ineffective dielectric layer that is adjacent to the relevant conductor layer 140. More specifically, an extent $B_1$ of curvature of the second conductor layer 148, which is positioned closest to the first principal surface 111 of the laminate 110 in the lamination direction, is larger than the thickness of the second ineffective dielectric layer 135 that is adjacent to the second conductor layer 148. An extent $B_2$ of curvature of the first conductor layer 149, which is positioned closest to the second principal surface 112 of the laminate 110 in the lamination direction, is larger than the thickness of the first ineffective dielectric layer 134 that is adjacent to the first conductor layer 149.

In each of the two conductor layers 140 positioned at both the ends of the laminate 110 in the lamination direction, the extent of curvature in the section perpendicular or substantially perpendicular to the lengthwise direction L of the laminate 110 is preferably larger than that in the section perpendicular or substantially perpendicular to the widthwise direction W of the laminate 110.

Individual constituent elements of the multilayer capacitor 100 will be described in detail below.

A material constituting the dielectric layer 130 may be a dielectric ceramic containing, as a main component, $BaTiO_3$, $CaTiO_3$, $SrTiO_3$, $CaZrO_3$, or the like. The material constituting the dielectric layer 130 may be a dielectric ceramic containing, in addition to the above-mentioned main component, an accessory component such as a Mn compound, a Mg compound, a Si compound, a Co compound, a Ni compound, or a rare earth compound.

A material constituting the conductor layer 140 may be a metal such as Ni, Cu, Ag, Pd or Au, or an alloy containing at least one of those metals, e.g., an alloy of Ag and Pd. The thickness of each conductor layer 140 is preferably about 0.2 µm or more and about 2.0 µm or less after firing, for example.

Each of the pair of outer electrodes 120 includes an underlying layer that is disposed in covering relation to both the end portions of the laminate 110, and a plating layer that is disposed in covering relation to the underlying layer. A material constituting the underlying layer may be a metal such as Ni, Cu, Ag, Pd or Au, or an alloy containing at least one of those metals, e.g., an alloy of Ag and Pd. The thickness of the underlying layer is preferably about 10.0 μm or more and about 50.0 μm or less.

The underlying layer may be formed by coating conductive pastes over both the end portions of the laminate 110 and baking the coated pastes, or formed through co-firing together with the conductor layers 140. As an alternative, the underlying layer may be formed by plating coatings over both the end portions of the laminate 110, or formed by coating conductive resins, including thermosetting resin, over both the end portions of the laminate 110 and solidifying the coated resins.

A material constituting the plating layer may be a metal such as Ni, Cu, Ag, Pd or Au, or an alloy containing at least one of those metals, e.g., an alloy of Ag and Pd.

The plating layer may be constituted by a plurality of layers. In that case, the plating layer is preferably of a two-layer structure including a Ni plating layer and a Sn plating layer on the Ni plating. The Ni plating layer defines and functions as a solder barrier layer. The Sn plating layer exhibits good wettability with respect to solder. The thickness of the plating layer per layer is preferably about 1.0 μm or more and about 10.0 μm or less, for example.

Figure 6:
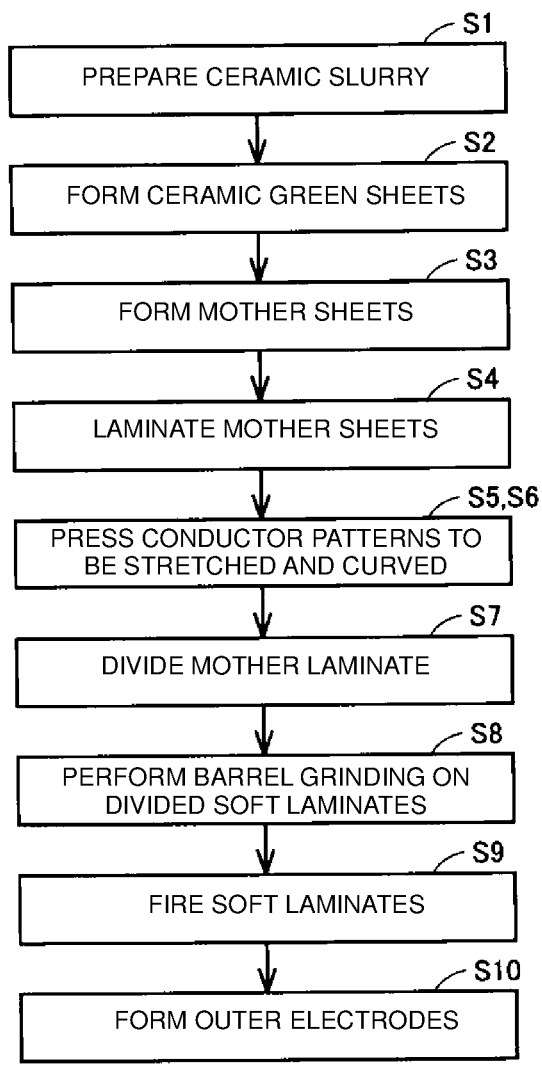
FIG. 6 is a flowchart representing a manufacturing method for the multilayer capacitor according to the first preferred embodiment of the present invention.

A non-limiting example of a manufacturing method for the multilayer capacitor 100 according to this preferred embodiment will be described below. FIG. 6 is a flowchart representing the manufacturing method for the multilayer capacitor according to the first preferred embodiment of the present invention.

As illustrated in FIG. 6, when manufacturing the multilayer capacitor 100, a ceramic slurry is first prepared (step S1). More specifically, ceramic powder, a binder, and a solvent are mixed at a predetermined mixing ratio, such that the ceramic slurry is obtained.

Then, a ceramic green sheet is formed (step S2). More specifically, the ceramic slurry is coated in a sheet shape over a carrier film by employing, e.g., a die coater, a gravure coater, or a micro-gravure coater, such that the ceramic green sheet is formed.

Figure 8:
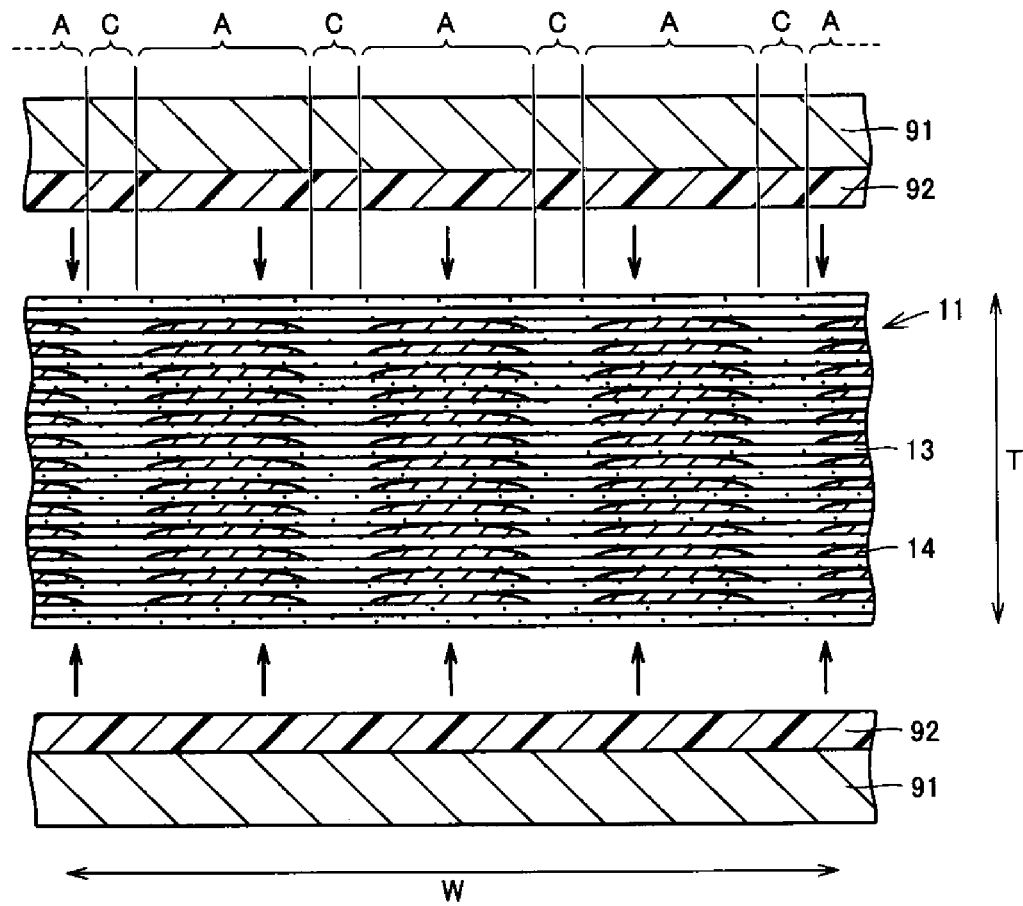
FIG. 8 is a sectional view of the multilayer capacitor, taken along a widthwise direction W thereof, the view illustrating the mother laminate before being pressed.

Then, mother sheets are formed (step S3). More specifically, in some of the plurality of ceramic green sheets formed described above, a conductive paste to form the conductor layer is coated over each of the some ceramic green sheets in a predetermined pattern by a screen printing method or a gravure printing method. As illustrated in FIG. 8 described later, a conductor pattern 14 includes a circular arc shape in which the thickness of the conductor pattern 14 gradually decreases from a central portion toward an end portion of the conductor pattern 14 in the widthwise direction.

Thus, the ceramic green sheets each including the conductive pattern formed thereon and each becoming the conductor layer, and the ceramic green sheets each not including the conductive pattern formed thereon are prepared as the mother sheets. The conductive paste to form the conductor layers may contain other known binder and solvent.

Then, the mother sheets are laminated (step S4). More specifically, a predetermined number of the ceramic green sheets each not including the conductive pattern formed thereon are laminated to form the second outer layer portion 132. On the outer layer portion 132, the plurality of ceramic green sheets each including the conductive pattern formed thereon are successively laminated to form the inner layer portion. On the inner layer portion, a predetermined number of the ceramic green sheets each not including the conductive pattern formed thereon are laminated to form the first outer layer portion 131. As a result, a mother laminate including the plurality of laminated mother sheets is constituted.

Then, the mother laminate is pressed such that the conductor patterns becoming the conductor layers are stretched (step S5) and curved (step S6). While, in this preferred embodiment, the step S5 of stretching the conductor patterns becoming the conductor layers and the step S6 of curving the conductor patterns becoming the conductor layers are performed at the same time, the present invention is not limited to such an example, and the steps S5 and S6 may be performed separately. In another example, after performing the step S5 of stretching the conductor patterns becoming the conductor layers by pressing a mother laminate that constitutes only the inner layer portion, the step S6 of curving the conductor patterns becoming the conductor layers may be performed by laminating the predetermined number of ceramic green sheets, which constitute at least one of the first outer layer portion 131 and the second outer layer portion 132, on the relevant mother laminate, and by pressing it again.

Figure 7:
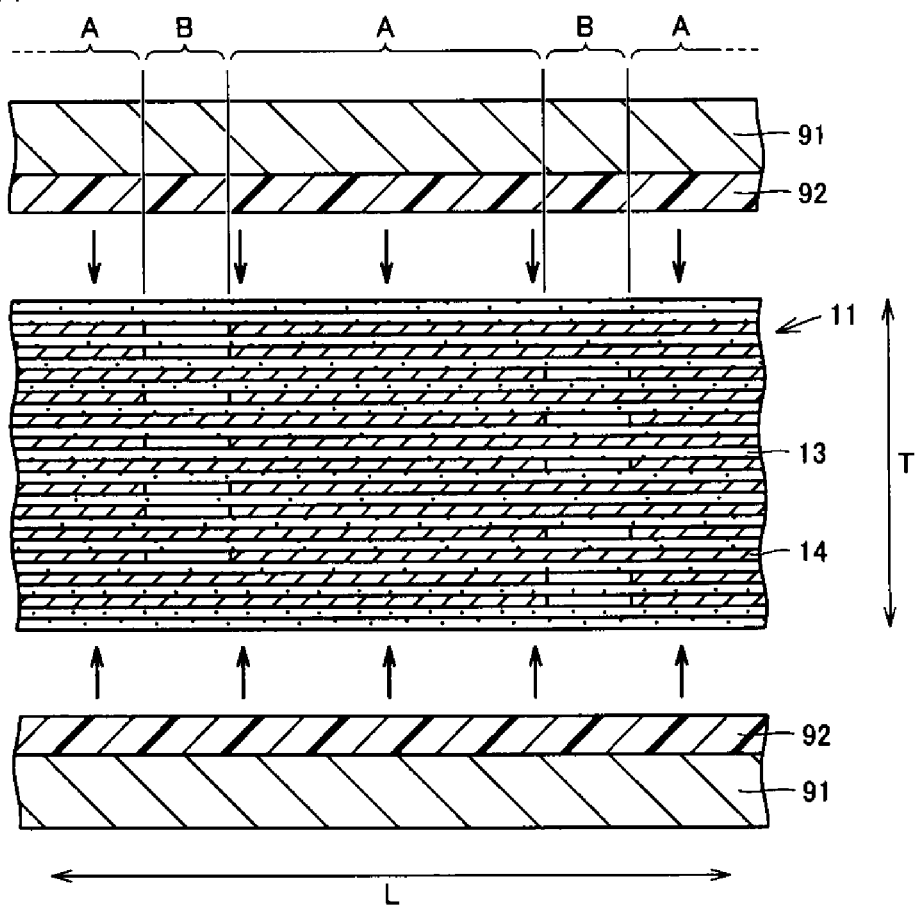
FIG. 7 is a sectional view of the multilayer capacitor, taken along a lengthwise direction L thereof, the view illustrating a mother laminate before being pressed.
Figure 9:
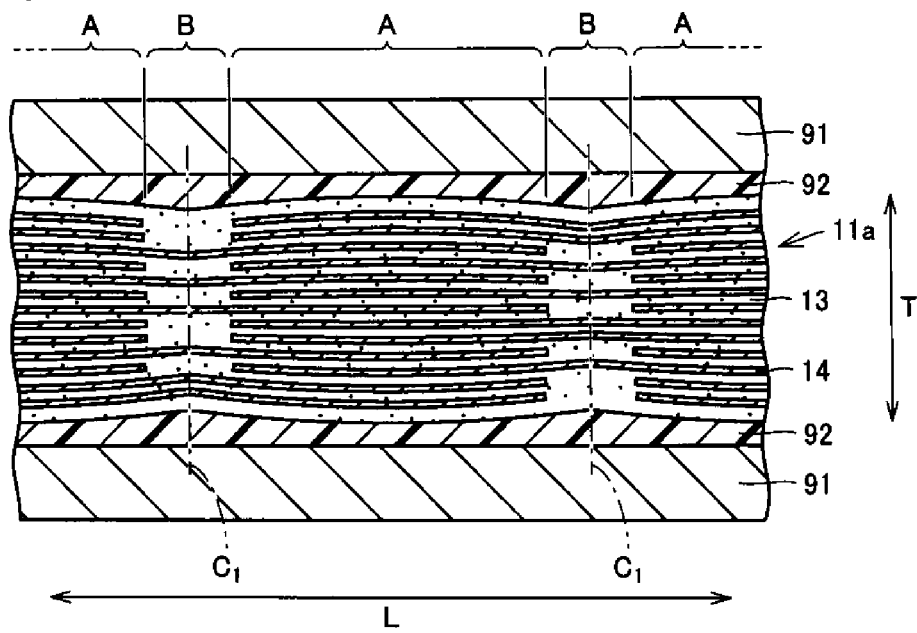
FIG. 9 is a sectional view of the multilayer capacitor, taken along the lengthwise direction L thereof, the view illustrating the mother laminate after being pressed.
Figure 10:
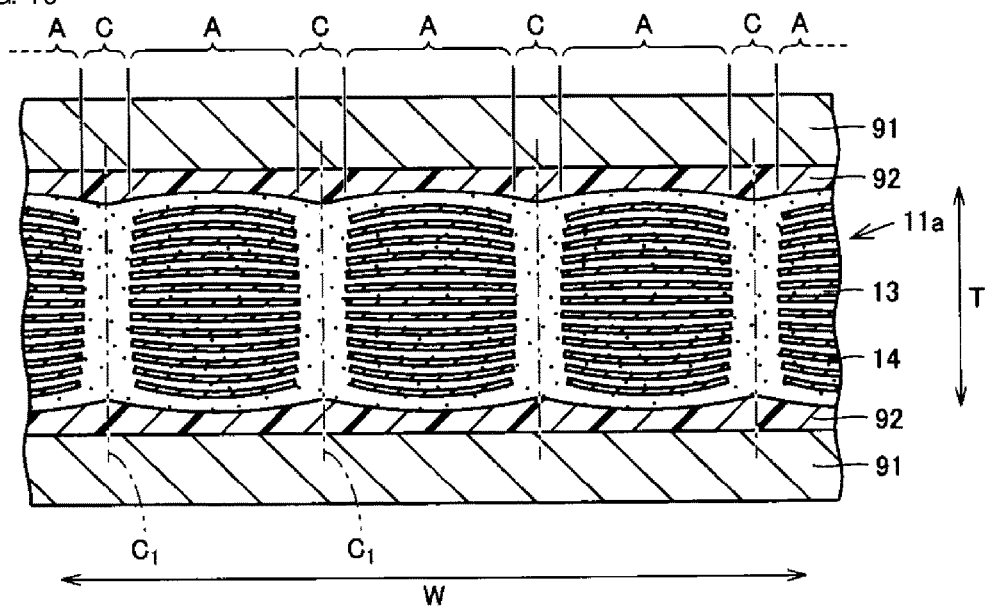
FIG. 10 is a sectional view of the multilayer capacitor, taken along the widthwise direction W thereof, the view illustrating the mother laminate after being pressed.

FIG. 7 is a sectional view of the multilayer capacitor, taken along the lengthwise direction L thereof, the view illustrating the mother laminate before being pressed. FIG. 8 is a sectional view of the multilayer capacitor, taken along the widthwise direction W thereof, the view illustrating the mother laminate before being pressed. FIG. 9 is a sectional view of the multilayer capacitor, taken along the lengthwise direction L thereof, the view illustrating the mother laminate after being pressed. FIG. 10 is a sectional view of the multilayer capacitor, taken along the widthwise direction W thereof, the view illustrating the mother laminate after being pressed.

As illustrated in FIG. 7, in a mother laminate 11, a region A where the conductor patterns 14 exist in a comparatively large number and a region B where the conductor patterns 14 exist in a comparatively small number are alternately present in the lengthwise direction L of the laminate 110. On the other hand, as illustrated in FIG. 8, in the mother laminate 11, the region A where the conductor patterns 14 exist in a large number and a region C where the conductor patterns 14 do not exist and only a dielectric portion 13 exists are alternately present in the widthwise direction W of the laminate 110.

As illustrated in FIGS. 7 and 8, the mother laminate is pressed in the lamination direction for pressure bonding with a pair of flat-plate dies 91. In the mother laminate 11, the density of the laminated conductor patterns is higher in the region A than in the regions B and C. Therefore, the conductor patterns 14 positioned in the region A are pressed and stretched toward the regions B and C. The conductor patterns 14 having been stretched toward the regions B and C are further pressed by the ceramic materials having flowed from the first outer layer portion or the second outer layer portion. Thus, the stretched conductor patterns 14 are projected in a downward or upward convex shape. As illustrated in FIGS. 7 and 8, the mother laminate 11 is preferably pressed in such a state that rubbers 92 are attached to pressing surfaces of the pair of flat-plate dies 91. With the provision of the rubbers 92, the conductor patterns 14 are caused to curve more effectively. As described above, the mother laminate is formed.

Here, in one of the laminates adjacent to each other in the lengthwise direction of the laminate when the mother laminate is divided as described later, the ceramic green sheets including the conductor patterns formed to be included in the first arrangement and becoming the first conductor layers 141 are each called an A pattern, and the ceramic green sheets including the conductor patterns formed to be included in the second arrangement and becoming the second conductor layers 142 are each called a B pattern. By laminating the ceramic green sheets of the A pattern and the B pattern, the ceramic green sheet sandwiched between the laminated conductor patterns becomes the effective dielectric layer 133.

On the other hand, by laminating the ceramic green sheets of the A pattern, the ceramic green sheet sandwiched between the laminated conductor patterns becomes the first ineffective dielectric layer 134. By laminating the ceramic green sheets of the B pattern, the ceramic green sheet sandwiched between the laminated conductor patterns becomes the second ineffective dielectric layer 135.

Stated in another way, the effective dielectric layer 133, the first ineffective dielectric layer 134, and the second ineffective dielectric layer 135 can be formed by preparing only two types of the ceramic green sheets, i.e., the A pattern and the B pattern, each including the conductor pattern formed thereon. Thus, the mother laminate 11 can be manufactured easily and efficiently. Moreover, the A pattern and the B pattern can be both prepared by using the ceramic green sheets including one type of conductor pattern formed thereon in common, and by shifting the position of the conductor pattern between the A pattern and the B pattern when the ceramic green sheets are laminated. Accordingly, the mother laminate can be manufactured by using the ceramic green sheets including the one type of conductive pattern formed thereon.

In the other of the laminates adjacent to each other in the lengthwise direction of the laminate when the mother laminate is divided as described later, the ceramic green sheets including the conductor patterns formed to be included in the first arrangement and becoming the first conductor layers 141 are each provided by the sheet of the above-mentioned B pattern, and the ceramic green sheets including the conductor patterns formed to be included in the second arrangement and becoming the second conductor layers 142 are each provided by the sheet of the above-mentioned A pattern. Thus, in each of the laminates adjacent to each other in the lengthwise direction of the laminate when the mother laminate is divided as described later, the conductor patterns included in the first arrangement and the conductor patterns included in the second arrangement are laminated with the dielectric layer sandwiched between them in the laminating step (step S4).

Then, the mother laminate is divided (step S7). More specifically, the mother laminate is divided along cut lines $C_1$ in the regions B and the regions C by a push cutter or a dicing machine, such that a plurality of soft laminates each having a substantially rectangular parallelepiped shape is obtained. Then, the soft laminates are subjected as appropriate to barrel grinding (step S8), such that outer surfaces (particularly corners and ridges) of the soft laminates are rounded into curved surfaces.

Then, the soft laminates are fired (step S9). More specifically, the soft laminates are heated to a predetermined temperature, such that the ceramic materials and the conductive materials are sintered. As a result, the laminates 110 are formed.

Then, the outer electrodes are formed (step S10). More specifically, conductive pastes to form the outer electrodes are coated over both the end portions of the laminate 110 by one of various printing methods, a dipping method, etc., and are heated to form the underlying layers.

Then, the plating layers are formed on the underlying layers by depositing metal components with a plating method. Through the step of forming the underlying layer and the step of forming the plating layer, the outer electrodes 120 can be provided over the both end portions of the laminate 110 such that the outer electrodes 120 are electrically connected to the conductor layers 140. The multilayer capacitor 100 according to this preferred embodiment can be manufactured through a series of the above-described steps.

In each of the outer electrodes in the ultra-small multilayer capacitor, the underlying layer preferably has a smaller thickness, for example, by forming it by a sputtering method instead of coating the conductive paste. It is to be noted that the underlying layer is not always required to be formed. With omission of the underlying layer, the thickness of the outer electrode is reduced, and the volume of the laminate is increased without increasing the size of the multilayer capacitor 100. With an increase in the volume of the laminate, the number of the ineffective dielectric layers is able to be increased, and the degree of freedom in design to obtain the desired electrostatic capacitance is able to be increased.

An experimental example aiming to clarify a relation of the number of the laminated ineffective dielectric layers and the (total) number of the laminated conductor layers with respect to the electrostatic capacitance of the multilayer capacitor will be described below.

Experimental Example

In an experimental example, three types of samples each including the effective dielectric layers laminated in the same number, i.e., 21, and including the ineffective dielectric layers laminated in different numbers were prepared. More specifically, the number of the laminated ineffective dielectric layers was 0 in the sample 1, 10 in the sample 2, and 22 in the sample 3. In other words, the (total) number of the laminated conductor layers was 22 in the sample 1, 32 in the sample 2, and in the sample 3. The total thickness of the first outer layer portion 131 and the second outer layer portion 132 is reduced by an amount corresponding to an increase in the number of the laminated ineffective dielectric layers. Thus, the total thickness of the first outer layer portion 131 and the second outer layer portion 132 is reduced in the order of the sample 1, the sample 2, and the sample 3.

Conditions in common to the three types of samples were as follows. The external dimensions (design values) of the laminate (after firing) were 0.212 mm in length, 0.102 mm in width, and 0.102 mm in thickness. The dimensions (design values) of the conductor layer (after firing) were 0.122 mm in length, 0.047 mm in width, and 0.65 µm in thickness. The dimension (design value) of the dielectric layer (after firing) was 0.75 µm in thickness. The number of the laminated dielectric layers was 21.

The electrostatic capacitance of the multilayer capacitor was measured by employing an electrostatic capacitance meter (LCR meter) under the measurement conditions in conformity with the standard specification (JIS C 5101-11998).

Figure 12:
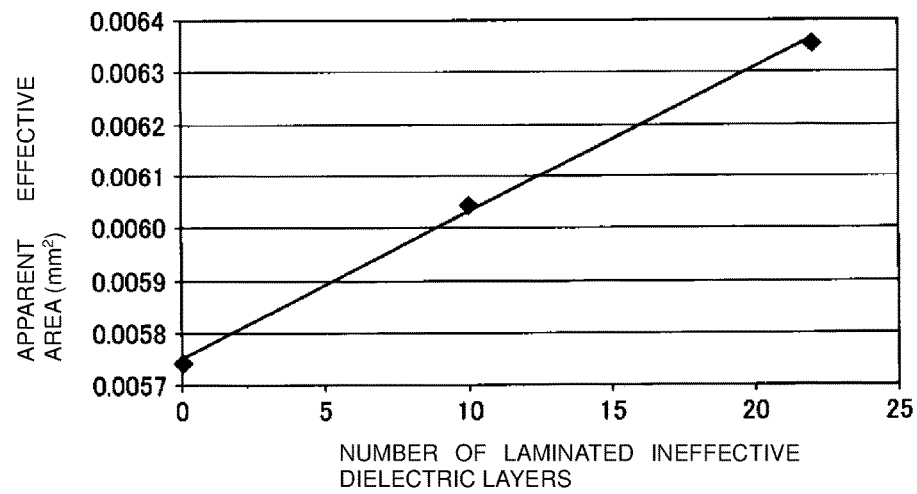
FIG. 12 is a graph depicting a relation between the number of laminated ineffective dielectric layers and an apparent effective area of a conductor layer.

The extent of curvature of the conductor layer in the section perpendicular or substantially perpendicular to the lengthwise direction L of the laminate 110 was determined by making a WT section passing through the center of the laminate 110 that had been exposed by polishing, observing the exposed section with a scanning electron microscope or an optical microscope, measuring the extent $B_1$ of curvature of the conductor layer 140 closest to the first principal surface 111 in the lamination direction of the laminate 110 and the extent $B_2$ of curvature of the conductor layer 140 closest to the second principal surface 112 in the lamination direction of the laminate 110, and by adopting larger one of the measured values.

vertical axis represents the electrostatic capacitance (nF) of the multilayer capacitor, and the horizontal axis represents the number of the laminated ineffective dielectric layers. In FIG. 12, the vertical axis represents the apparent effective area (mm$^2$) of the conductor layer, and the horizontal axis represents the number of the laminated ineffective dielectric layers.

TABLE

| | Number of laminated effective dielectric layers (total) | Number of laminated ineffective dielectric layers (total) | Number of laminated conductor layers (total) | Effective width of conductor layer (mm) | Effective length of conductor layer (mm) | Apparent effective area of conductor layer (mm$^2$) | Extent of curvature of conductor layer (μm) | Electrostatic capacitance (nF) of multilayer capacitor |
|---|---|---|---|---|---|---|---|---|
| Sample 1 | 21 | 0 | 22 | 0.0471 | 0.1222 | 0.00574 | 5.47 | 4.55 |
| Sample 2 | 21 | 10 | 32 | 0.0491 | 0.1230 | 0.00604 | 5.93 | 5.22 |
| Sample 3 | 21 | 22 | 44 | 0.0519 | 0.1226 | 0.00636 | 6.42 | 5.90 |

The extents $B_1$ and $B_2$ of curvature of the conductor layers 140 were each determined as a value obtained by measuring, along the thickness direction T of the laminate 110, a distance between the center and the end portion of the relevant conductor layer 140 in the widthwise direction W of the laminate 110. The thickness of the dielectric layer was determined as a value obtained by observing the WT section passing through the center of the laminate 110 with a scanning electron microscope or an optical microscope, and by measuring the thickness of the dielectric layer along a linear line passing through the center of the laminate 110.

The effective width of the conductor layer was determined by making the WT section passing through the center of the laminate 110 exposed by polishing, observing the exposed section with a scanning electron microscope or an optical microscope, measuring, for each of the effective dielectric layer closest to the center of the laminate and the effective dielectric layers positioned at both the ends of the laminate in the lamination direction, a width of a portions in which the conductor layers sandwiching each of those three effective dielectric layers are opposed to each other, and by adopting an average value of the widths measured for those three effective dielectric layers.

The effective length of the conductor layer was determined by making an LT section passing through the center of the laminate 110 exposed by polishing, observing the exposed section with a scanning electron microscope or an optical microscope, measuring, for each of the effective dielectric layer closest to the center of the laminate and the effective dielectric layers positioned at both the ends of the laminate in the lamination direction, a length of the portion in which the conductor layers sandwiching one of those three effective dielectric layers are opposed to each other, and by adopting an average value of the lengths measured for those three effective dielectric layers. The apparent effective area of the conductor layer was determined as the product of the effective width of the conductor layer and the effective length of the conductor layer.

Figure 11:
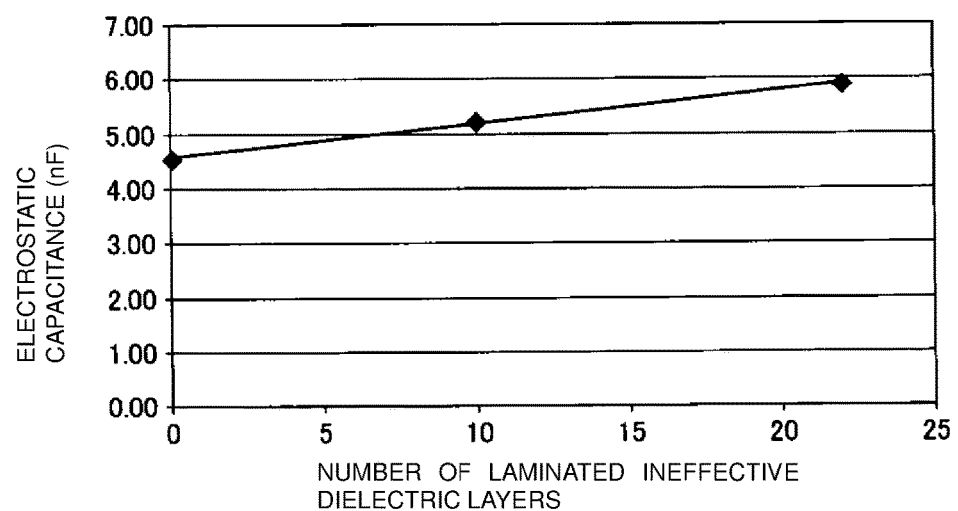
FIG. 11 is a graph depicting a relation between the number of laminated ineffective dielectric layers and electrostatic capacitance of the multilayer capacitor.

The Table below lists the results obtained in the experimental example. FIG. 11 is a graph depicting a relation between the number of the laminated ineffective dielectric layers and the electrostatic capacitance of the multilayer capacitor. FIG. 12 is a graph depicting a relation between the number of the laminated ineffective dielectric layers and the apparent effective area of the conductor layer. In FIG. 11, the As seen from the Table and FIG. 11, the electrostatic capacitance of the multilayer capacitor increases in proportion to the number of the laminated ineffective dielectric layers. Furthermore, as seen from Table and FIG. 12, the apparent effective area of the conductor layer increases in proportion to the number of the laminated ineffective dielectric layers.

As a result of reviewing the above-mentioned results of the experimental example in detail, the inventors have discovered the following.

The reason why the apparent effective area of the conductor layer increases in proportion to the number of the laminated ineffective dielectric layers resides in that the number of void portions where the dielectric portion 13 does not exit is increased in the regions B and C of the mother laminate 11, as illustrated in FIGS. 7 and 8, by increasing the number of the laminated ineffective dielectric layers, namely by increasing the (total) number of the laminated conductor layers. When the pressure bonding is performed on the mother laminate, the conductor patterns 14 are pressed and stretched to come into the void portions. As a result, the conductor layers are expanded outwards as illustrated in FIGS. 4 and 5, and the apparent effective area of each of the conductor layers is increased.

As seen from the Table, in the sample 2, the apparent effective area of the conductor layer increases about 5.2% and the electrostatic capacitance of the multilayer capacitor increases about 14.7% in comparison with those in the sample 1. In the sample 3, the apparent effective area of the conductor layer increases about 10.8% and the electrostatic capacitance of the multilayer capacitor increases about 29.7% in comparison with those in the sample 1.

Thus, an increase rate of the electrostatic capacitance of the multilayer capacitor is larger than that of the apparent effective area of the conductor layer. The reason is presumably resides in the influence resulting from the extent of curvature of the conductor layer.

The reason why the extent of curvature of the conductor layer increases in proportion to the number of the laminated ineffective dielectric layers increases is as follows. As discussed above, the number of the void portions where the dielectric portion 13 does not exit is increased in the regions B and C of the mother laminate 11, as illustrated in FIGS. 7 and 8, by increasing the number of the laminated ineffective dielectric layers, namely by increasing the (total) number of the laminated conductor layers. In other words, the density of the laminated conductor patterns is reduced in the regions B and C. Therefore, when the pressure bonding is performed on the mother laminate, the extent of curvature of the mother sheets positioned in the regions B and C of the mother laminate 11 is increased as illustrated in FIGS. 9 and 10. Thus, the extent of curvature of the conductor layer increases as the number of the laminated ineffective dielectric layers increases.

With the curving of the conductor layers sandwiching the effective dielectric layer between them, the area in which the conductor layers are opposed to each other is further increased. While the above-described apparent effective area of the conductor layer is the area in which the conductor layers are opposed to each other when looked at in a plan view, the effective area actually contributing to the electrostatic capacitance, in which area the conductor layers are opposed to each other, is increased because of the conductor layers being curved.

The inventors have discovered that the electrostatic capacitance of the multilayer capacitor is able to be increased by increasing the number of the laminated ineffective dielectric layers, thus increasing the effective area actually contributing to the electrostatic capacitance, in which area the conductor layers are opposed to each other. Furthermore, the inventors have clarified that the electrostatic capacitance of the multilayer capacitor increases in proportion to the number of the laminated ineffective dielectric layers. In other words, the inventors have clarified that the electrostatic capacitance of the multilayer capacitor is able to be finely adjusted by increasing the number of the laminated ineffective dielectric layers, thereby increasing the (total) number of the laminated conductor layers, without changing the number of the laminated effective dielectric layers.

In this experimental example, the increase rate of the electrostatic capacitance per ineffective dielectric layer is 29.7%÷22=1.4%. The increase rate of the electrostatic capacitance per effective dielectric layer is 1÷21×100=4.8%.

Figure 13:
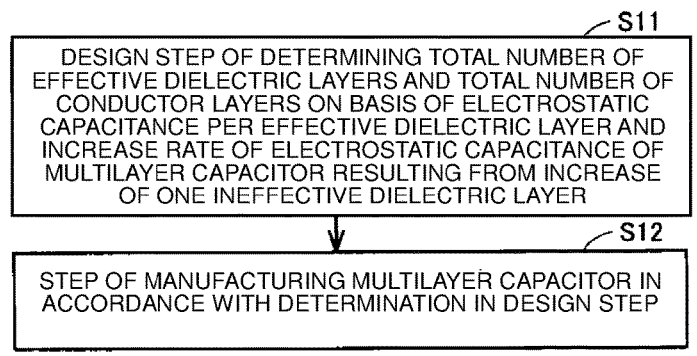
FIG. 13 is a flowchart representing the manufacturing method for the multilayer capacitor according to the first preferred embodiment of the present invention.

An ultra-small multilayer capacitor having the desired electrostatic capacitance can be obtained by utilizing the above-described mechanism. FIG. 13 is a flowchart representing a non-limiting example of a manufacturing method for the multilayer capacitor according to the first preferred embodiment of the present invention.

As illustrated in FIG. 13, the manufacturing method for the multilayer capacitor according to the first preferred embodiment of the present invention includes a design step (step S11) of determining the total number of the effective dielectric layers and the total number of the conductor layers on the basis of the electrostatic capacitance per effective dielectric layer and the increase rate of the electrostatic capacitance of the multilayer capacitor resulting from an increase of one ineffective dielectric layer, the former electrostatic capacitance per effective dielectric layer and the latter increase rate of the electrostatic capacitance being calculated from three parameters, i.e., the dielectric constant of the dielectric constituting the dielectric layer, the area of the first conductor layer and the second conductor layer opposing to each other, and the distance between the first conductor layer and the second conductor layer opposing to each other. The manufacturing method further includes a step (S12) of manufacturing the multilayer capacitor in accordance with the determination in the design step. Thus, in the step (S12) of manufacturing the multilayer capacitor, the conductor layers and the dielectric layers are laminated in respective numbers on conditions of satisfying the total number of the effective dielectric layers and the total number of the conductor layers, which have been determined in the design step (step S11).

More specifically, after confirming the increase rate of the electrostatic capacitance per ineffective dielectric layer, the (total) number of the laminated effective dielectric layers to ensure the electrostatic capacitance in units of about 5% and the (total) number of the conductor layers to ensure the electrostatic capacitance in units of about 1.5% are determined in the design step (step S11).

By manufacturing the multilayer capacitor in accordance with the above-described determination in the design step, the desired electrostatic capacitance is able to be ensured in the ultra-small multilayer capacitor in which the (total) number of the laminated conductor layers is small.

The increase rate of the electrostatic capacitance per ineffective dielectric layer is able to be adjusted by changing respective amounts of binders contained in the ceramic slurry and the conductive paste, thus changing easiness in stretching the ceramic green sheets and the conductor patterns.

In order to adjust the electrostatic capacitance of the multilayer capacitor by increasing or decreasing the number of the laminated ineffective dielectric layers, it is required to stretch the conductor patterns in the above-described stretching step (step S5), and to curve the conductor patterns, which become the conductor layers, in the above-described bending step (step S6). As a result of conducting intensive studies, the inventors have discovered that the conductor patterns are able to be each effectively stretched and curved by setting, in the multilayer capacitor, the width of the conductor layer 140 to satisfy conditions that the difference between the width of the conductor layer 140 and the width of the laminate 110 is less than about 0.12 mm, and that the width of the conductor layer 140 is about 70% or less of the width of the laminate 110, for example.

In more detail, if the region C is too narrow in FIG. 8, the conductor patterns are less susceptible to stretching when they are pressed. From that point of view, the width of the conductor layer 140 is preferably about 70% or less of the width of the laminate 110 to ensure that the conductor patterns are sufficiently pressed and stretched. To the contrary, if the region C is too wide, the ceramic green sheets are pressure-bonded to each other in a way of filling the void portions in the region C before the conductor patterns are sufficiently pressed and stretched. Hence the conductor patterns are less susceptible to stretching when they are pressed. From that point of view, the difference between the width of the conductor layer 140 and the width of the laminate 110 is preferably less than about 0.12 mm to ensure that the conductor patterns are sufficiently pressed and stretched. With the conductor patterns being sufficiently pressed and stretched, the conductor patterns are able to be sufficiently curved by the ceramic green sheets having flowed into the region C.

As in the multilayer capacitor according to the first preferred embodiment of the present invention, the extent of curvature of at least one of two conductor layers 140 in the section perpendicular or substantially perpendicular to the lengthwise direction L of the laminate 110, those two conductor layers 140 being positioned at both the ends of the laminate 110 in the lamination direction, is preferably larger than the thickness of the ineffective dielectric layer that is adjacent to the relevant conductor layer 140, in order to reliably ensure the effective area actually contributing to the electrostatic capacitance, in which area the conductor layers are opposed to each other.

Furthermore, in the design step (step S11), the layout of the ineffective dielectric layer is preferably determined such that at least one of the two conductor layers 140 positioned at both ends of the laminate 110 in the lamination direction is adjacent to the ineffective dielectric layer. In such a case, the reliability of the multilayer capacitor 100 is increased because the ineffective dielectric layer positioned at the end of the laminate 110 in the lamination direction exhibits the function of protecting the effective dielectric layers that are positioned inside the inner layer portion.

Moreover, in the design step (step S11), the layout of the ineffective dielectric layer is preferably determined such that the conductor layer 140 positioned at the center of the laminate 110 in the lamination direction is adjacent to the ineffective dielectric layer. In such a case, because the dielectric layer positioned at the center of the laminate 110 where the mother sheet is likely to be most thinned by the pressure-bonding of the mother sheets is given as the ineffective dielectric layer, there is no possibility of short-circuiting even when the ineffective dielectric layer is thinned and insulation resistance is reduced. As a result, the reliability of the multilayer capacitor 100 is increased.

A multilayer capacitor and a manufacturing method for the multilayer capacitor, according to a second preferred embodiment of the present invention, will be described below. The multilayer capacitor and the manufacturing method for the multilayer capacitor, according to the second preferred embodiment, are different from the multilayer capacitor and the manufacturing method for the multilayer capacitor, according to the first preferred embodiment, only in lamination pattern of the laminate. Therefore, description of the other points is not repeated here.

Second Preferred Embodiment

Figure 14:
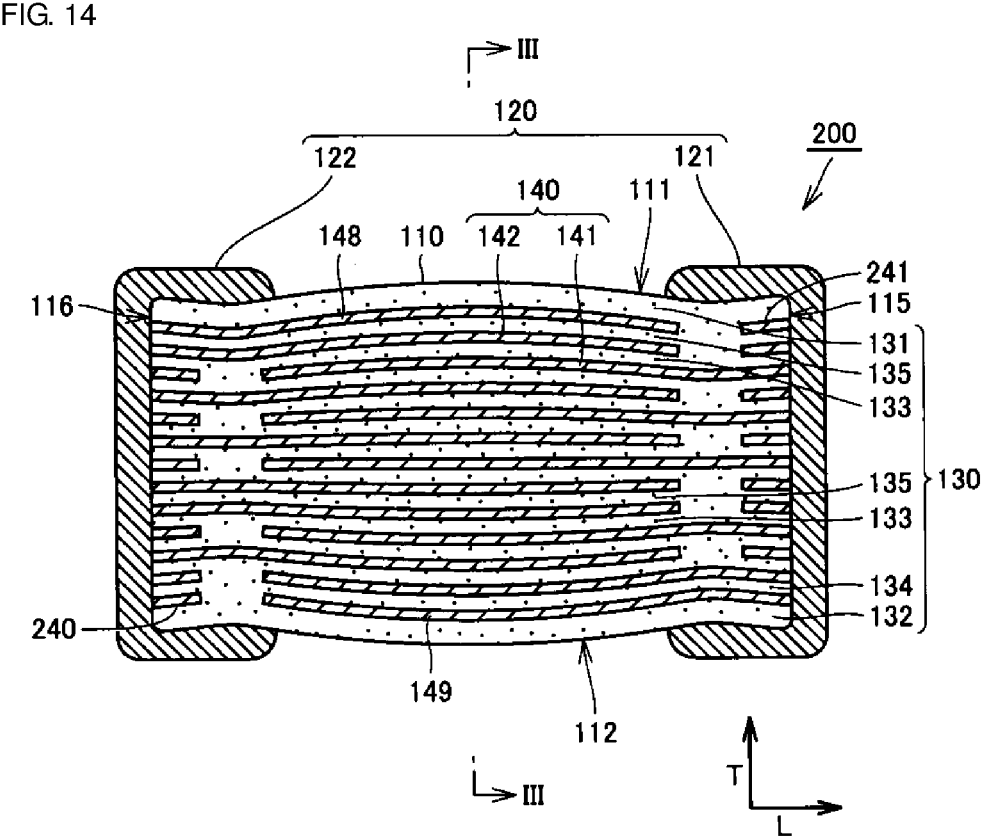
FIG. 14 is a sectional view illustrating a structure of a multilayer capacitor according to a second preferred embodiment of the present invention.

FIG. 14 is a sectional view illustrating a structure of the multilayer capacitor according to the second preferred embodiment of the present invention. A section illustrated in FIG. 14 is taken in the same manner as that illustrated FIG. 2. A section of the multilayer capacitor illustrated in FIG. 14, taken along a line III-III and viewed from a direction denoted by arrow, is as per illustrated in FIG. 3.

As illustrated in FIG. 14, the multilayer capacitor 200 according to the second preferred embodiment of the present invention includes third conductor layers 240 that are disposed in spaced relation from the end portions of the first conductor layers 141 at the side closer to the second end surface 116, and that are connected to the second outer electrode 122. The multilayer capacitor 200 further includes fourth conductor layers 241 that are disposed in spaced relation from the end portions of the second conductor layers 142 at the side closer to the first end surface 115, and that are connected to the first outer electrode 121.

In the manufacturing method for the multilayer capacitor according to the second preferred embodiment of the present invention, pressure bonding is performed on the mother laminate as follows.

Figure 15:
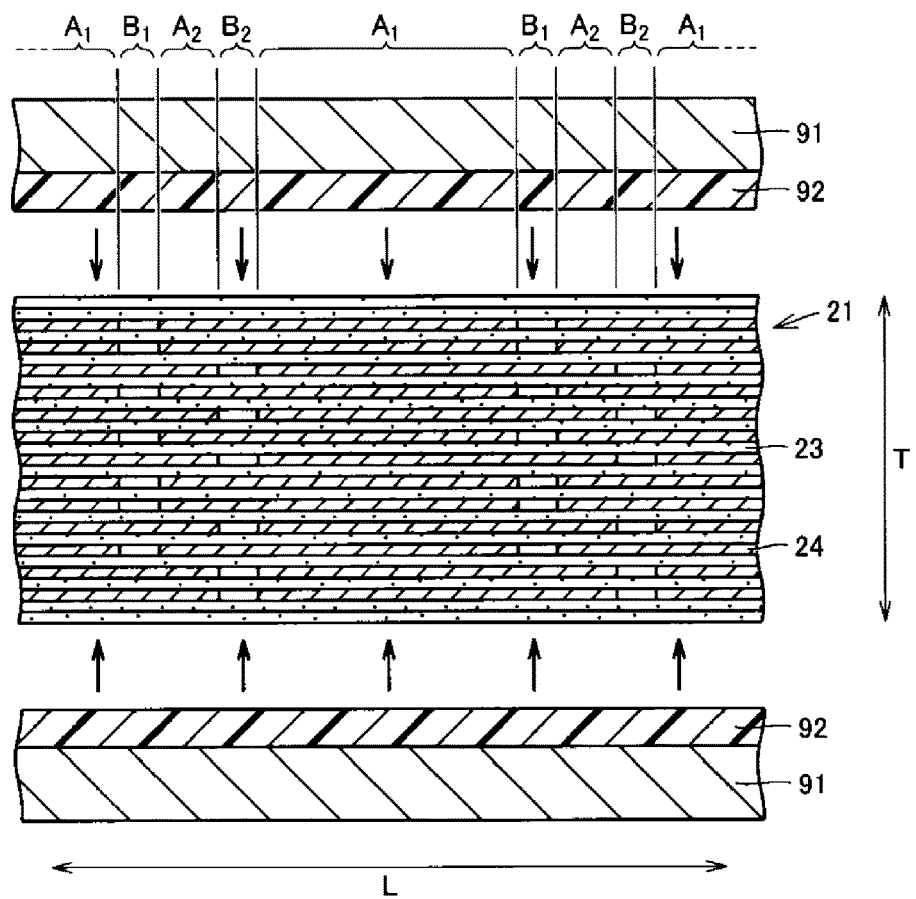
FIG. 15 is a sectional view of the multilayer capacitor according to the second preferred embodiment of the present invention, taken along a lengthwise direction L thereof, the view illustrating a mother laminate before being pressed.
Figure 16:
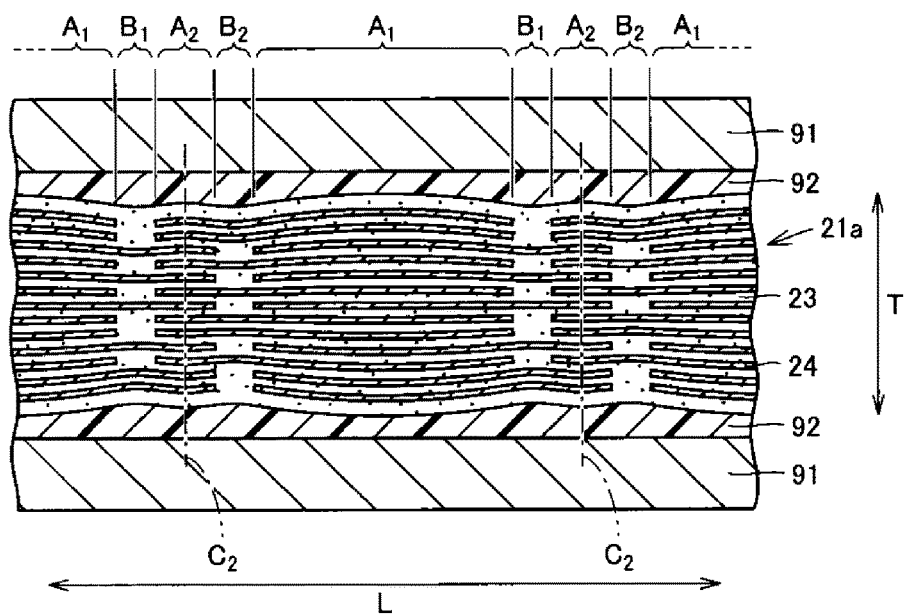
FIG. 16 is a sectional view of the multilayer capacitor according to the second preferred embodiment of the present invention, taken along the lengthwise direction L thereof, the view illustrating the mother laminate after being pressed.

FIG. 15 is a sectional view of the multilayer capacitor according to the second preferred embodiment of the present invention, taken along a lengthwise direction L thereof, the view illustrating the mother laminate before being pressed. FIG. 16 is a sectional view of the multilayer capacitor according to the second preferred embodiment of the present invention, taken along the lengthwise direction L thereof, the view illustrating the mother laminate after being pressed. A section of the multilayer capacitor taken along a widthwise direction W thereof is similar to that of the mother laminate in the first preferred embodiment. Therefore, description of that section is not repeated here.

As illustrated in FIG. 15, in a mother laminate 21, regions $A_1$ and $A_2$ where the conductor patterns 14 exist in a comparatively large number and regions $B_1$ and $B_2$ where the conductor patterns 14 exist in a comparatively small number are repeatedly arrayed in the order of $A_1$, $B_1$, $A_2$ and $B_2$ in the lengthwise direction L of the mother laminate 21.

As illustrated in FIG. 15, the mother laminate 21 is pressed in the lamination direction for pressure bonding with a pair of flat-plate dies 91 by employing an isostatic press, for example, the pair of flat-plate dies 91 including rubbers 92 that are attached to their pressing surfaces. In the mother laminate 21, the density of the laminated conductor patterns is higher in the regions $A_1$ and $A_2$ than in the regions $B_1$ and $B_2$. Upon being pressed against the mother laminate 21, therefore, the rubbers 92 are caused to flow and deform from the regions $A_1$ and $A_2$ toward the regions $B_1$ and $B_2$, thus projecting in a downward or upward convex shape, as illustrated in FIG. 16. Hence the mother sheets positioned in the regions $B_1$ and $B_2$ of the mother laminate are pressure-bonded to each other while being subjected to drawing such that the mother sheets come into a close contact state. As a result, the mother laminate is formed.

Thereafter, the mother laminate is divided (step S7). More specifically, the mother laminate is divided along cut lines $C_2$ in the region $A_2$ by a push cutter or a dicing machine, such that a plurality of soft laminates each having a substantially rectangular parallelepiped shape is obtained.

In this preferred embodiment, the effective area of the conductor layer can be adjusted by changing, in the lengthwise direction L of the multilayer capacitor 200, the positions at which the ceramic green sheets the A pattern and the B pattern, each including the conductor pattern formed thereon, are laminated. With the manufacturing method for the multilayer capacitor according to this preferred embodiment, the desired electrostatic capacitance can also be ensured in the ultra-small multilayer capacitor in which the (total) number of the conductor layers is small.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer capacitor comprising:
   a laminate including conductor layers and dielectric layers alternately laminated, the laminate including external dimensions including a length of about 0.45 mm or less and a width of 0.25 mm or less when viewed from a lamination direction; and
   a first outer electrode and a second outer electrode disposed on surfaces of the laminate, which are spaced from each other in a lengthwise direction of the laminate; wherein
   in the laminate, the dielectric layers and the conductor layers are alternately laminated such that the conductor layers are in a first arrangement and a second arrangement, the second arrangement being different from the first arrangement when viewed from the lamination direction, and such that the conductor layers are included in the first arrangement or the second arrangement;
   the first outer electrode is connected to ones of the conductor layers included in the first arrangement;

the second outer electrode is connected to others of the conductor layers included in the second arrangement;

a width of each of the conductor layers has a difference of less than about 0.12 mm between a width of the conductor layer and a width of the laminate, and is about 70% or less of the width of the laminate;

at least one of the dielectric layers is an ineffective dielectric layer that is sandwiched between the conductor layers both included in one of the first arrangement and the second arrangement;

at least one of the dielectric layers is an effective dielectric layer that is sandwiched between the conductor layer included in the first arrangement and the conductor layer included in the second arrangement;

at least one of the conductor layers adjacent to the effective dielectric layer is curved in the lamination direction; and each of a plurality of the conductor layers has an arc shape in which a thickness of a central portion of the conductor layer in a widthwise direction of the laminate is greater than a thickness of an end portion of the conductor layer in the widthwise direction.

2. The multilayer capacitor according to claim 1, wherein at least one of the two conductor layers positioned at both ends of the laminate in the lamination direction is adjacent to the ineffective dielectric layer.

3. The multilayer capacitor according to claim 1, wherein external dimensions of the multilayer capacitor are about 0.212 mm or less in length and about 0.102 mm or less in width when viewed from the lamination direction.

* * * * *